(12) United States Patent
Schäfer

(10) Patent No.: US 7,617,947 B2
(45) Date of Patent: Nov. 17, 2009

(54) STACKABLE STORAGE/TRANSPORT/STOCKING BOX WITH OPENABLE END

(75) Inventor: Gerhard Schäfer, Neunkirchen (DE)

(73) Assignee: Fritz Schafer GmbH, Neunkirchen (DE)

( * ) Notice: Subject to any disclaimer, the term of this patent is extended or adjusted under 35 U.S.C. 154(b) by 655 days.

(21) Appl. No.: 11/280,779

(22) Filed: Nov. 16, 2005

(65) Prior Publication Data

US 2006/0102633 A1 May 18, 2006

(30) Foreign Application Priority Data

Nov. 16, 2004 (DE) .................. 20 2004 017 786 U
Oct. 14, 2005 (DE) .................. 20 2005 016 115 U

(51) Int. Cl.
*B42F 17/10* (2006.01)
*B42F 17/14* (2006.01)
*B65D 6/18* (2006.01)
*B65D 8/14* (2006.01)
B65D 6/04 (2006.01)
B65D 6/06 (2006.01)

(52) U.S. Cl. ........................ 220/558; 220/666; 220/7; 220/4.28; 16/354; 312/328

(58) Field of Classification Search ............ 16/231, 16/232, 354; 220/4.28, 531, 558, 6, 7, 666; 312/327–329

See application file for complete search history.

(56) References Cited

U.S. PATENT DOCUMENTS

| 94,202 | A | * | 8/1869 | Gustafson | 47/73 |
| 460,768 | A | * | 10/1891 | Andrews et al. | 220/558 |
| 559,709 | A | * | 5/1896 | Hoff | 312/209 |
| 745,693 | A | * | 12/1903 | Tobey | 220/558 |
| 883,850 | A | * | 4/1908 | Aubuchon | 220/377 |
| 1,682,885 | A | * | 9/1928 | Butler | 220/324 |
| 1,935,582 | A | * | 11/1933 | Straubel | 220/558 |
| 2,055,170 | A | * | 9/1936 | Brainard | 220/223 |
| 2,528,551 | A | * | 11/1950 | Ross | 206/506 |
| 2,564,940 | A | * | 8/1951 | Weber | 217/60 R |
| 2,579,655 | A | * | 12/1951 | Archibald | 220/6 |
| 2,639,793 | A | * | 5/1953 | Hellman | 190/13 R |
| 2,917,052 | A | * | 12/1959 | Van Donk | 220/558 |
| 3,033,637 | A | * | 5/1962 | Van Donk et al. | 312/303 |
| 3,127,225 | A | * | 3/1964 | Oehrlein | 312/50 |

(Continued)

FOREIGN PATENT DOCUMENTS

DE 3104279 9/1982

(Continued)

*Primary Examiner*—Anthony D Stashick
*Assistant Examiner*—Ned A Walker
(74) *Attorney, Agent, or Firm*—Andrew Wilford

(57) ABSTRACT

A reusable box has a floor having opposite side edges and opposite end edges bridging the side edges, respective side walls extending upward from the side edges, a fixed end wall extending upward from one of the end edges and fixedly bridging between the side walls, and a movable end wall extending in a closed position upward from the other of the end walls and fitting between the side walls. The movable end wall is displaceable between a position clear of the side walls and giving access to an interior of the box at the other end. Formations extend to upper edges of both of the end walls that for nesting interfit and that for stacking vertically engage each other.

9 Claims, 4 Drawing Sheets

U.S. PATENT DOCUMENTS

| | | | | |
|---|---|---|---|---|
| 3,595,433 | A * | 7/1971 | Jones et al. | 206/737 |
| 3,840,115 | A * | 10/1974 | Ladewig | 206/506 |
| 4,629,089 | A * | 12/1986 | Federico et al. | 312/290 |
| 4,674,647 | A * | 6/1987 | Gyenge et al. | 220/6 |
| 4,759,451 | A | 7/1988 | Apps | 211/126.4 |
| 4,775,068 | A * | 10/1988 | Reiland et al. | 220/6 |
| 4,781,300 | A * | 11/1988 | Long | 220/7 |
| 4,896,070 | A * | 1/1990 | Reid et al. | 312/290 |
| 5,038,937 | A * | 8/1991 | DiSesa, Jr. | 206/501 |
| 5,161,709 | A * | 11/1992 | Oestreich, Jr. | 220/6 |
| D334,453 | S * | 3/1993 | Koloski | D3/323 |
| 5,238,115 | A * | 8/1993 | Schafer | 206/503 |
| 5,285,895 | A * | 2/1994 | Bolt | 206/709 |
| 5,503,294 | A * | 4/1996 | Taylor et al. | 220/571 |
| 5,515,987 | A * | 5/1996 | Jacques et al. | 220/6 |
| 5,588,549 | A * | 12/1996 | Furtner | 220/7 |
| 5,605,246 | A | 2/1997 | Rausch | 220/555 |
| 5,622,276 | A * | 4/1997 | Simmons | 220/6 |
| 5,632,392 | A * | 5/1997 | Oh | 220/7 |
| 5,673,791 | A * | 10/1997 | Jamison | 206/508 |
| 5,833,076 | A * | 11/1998 | Harres et al. | 211/51 |
| 5,857,830 | A * | 1/1999 | Harres et al. | 414/798.9 |
| 6,015,056 | A * | 1/2000 | Overholt et al. | 220/6 |
| 6,098,827 | A * | 8/2000 | Overholt et al. | 220/6 |
| 6,189,695 | B1 * | 2/2001 | Ching-rong | 206/509 |
| 6,209,742 | B1 * | 4/2001 | Overholt et al. | 220/6 |
| 6,216,872 | B1 * | 4/2001 | Haasbroek | 206/512 |
| 6,290,081 | B1 * | 9/2001 | Merey | 220/7 |
| 6,386,388 | B1 * | 5/2002 | Overholt | 220/608 |
| 6,390,756 | B1 * | 5/2002 | Isaacs et al. | 414/281 |
| 6,398,054 | B1 * | 6/2002 | Overholt et al. | 220/7 |
| 6,409,041 | B1 * | 6/2002 | Overholt et al. | 220/669 |
| 6,601,724 | B1 * | 8/2003 | Koefelda et al. | 220/6 |
| 6,631,822 | B1 * | 10/2003 | Overholt | 220/7 |
| 6,843,386 | B2 * | 1/2005 | Raghunathan et al. | 220/7 |
| 6,918,502 | B1 * | 7/2005 | Overholt et al. | 220/6 |
| 2002/0148842 | A1 * | 10/2002 | Overholt et al. | 220/669 |
| 2002/0158067 | A1 * | 10/2002 | Overholt et al. | 220/6 |
| 2004/0069780 | A1 * | 4/2004 | Apps et al. | 220/7 |
| 2004/0099662 | A1 * | 5/2004 | Overholt | 220/7 |
| 2004/0178197 | A1 * | 9/2004 | Hsu et al. | 220/7 |
| 2008/0283536 | A1 * | 11/2008 | Schafer | 220/558 |

FOREIGN PATENT DOCUMENTS

| | | |
|---|---|---|
| EP | 101287 A2 * | 2/1984 |
| EP | 0 876 963 | 11/1998 |
| FR | 2810963 | 1/2002 |

* cited by examiner

STACKABLE STORAGE/TRANSPORT/STOCKING BOX WITH OPENABLE END

FIELD OF THE INVENTION

The present invention relates to a reusable box suitable for storage, transport and stocking. More particularly this invention concerns such a box that can be stacked and even nested.

BACKGROUND OF THE INVENTION

In EP 0,876,963 of Triadu and Boulot such a box is shown. It has a rectangular floor and side and end walls that extend perpendicularly up from respective edges of the floor. One of the walls has a cutout that can be closed by a movable door flap. During transport and storage, the cutout is closed by the flap, but for stocking purposes the flap is hinged down so is that a user can reach into the box and retrieve items in it, even when the box is part of a stack of such boxes, that is otherwise upwardly closed by the overlying box. The difference between "stacking" and "nesting" is that when two boxes are stacked, the floor of the upper box sits on and is supported by the upper edge of the lower box, but when they are nested the floor of the upper box is recessed down in the lower box and may indeed even sit on the floor of the lower box.

A box according to EP 0,876,963 cannot be nested when empty so as to take up less space when being shipped back to the supplier. In addition the cutout is only big enough to allow removal through it of items that are substantially smaller than the end wall formed with the cutout. Thus such a box cannot be used for stocking large items. Finally, the cutout in one wall of the box makes it structurally somewhat less rugged, limiting how many of these boxes can be stacked atop one another and also limiting how much weight such a box can hold without deforming.

In order for boxes to be nestable, they must typically be formed with upwardly flaring walls so that they have a downwardly tapering shape. With enough taper, the boxes can be nested very tightly, with their floors literally resting directly one atop the other. The problem is that with increasing taper the boxes lose vertical strength, that is their side walls can withstand lesser vertical loads. Furthermore the required interfitting often necessitates a wall structure that is not very strong in general.

For a box to be both nestable and stackable, it is typically formed such that one side wall is generally complementary to but oppositely shaped from the opposite side wall. Thus one side wall can have two vertical ridges and the other one central ridge. When the two vertical ridges of one box are aligned with the one central ridge of an underlying box, the boxes nest, but when the two ridges on one side and the single ridges on the other side are vertically aligned, the boxes stack.

OBJECTS OF THE INVENTION

It is therefore an object of the present invention to provide an improved reusable box.

Another object is the provision of such an improved reusable box that overcomes the above-given disadvantages, in particular that is which can be opened fully, yet which can nest tightly and still form a stable stack.

SUMMARY OF THE INVENTION

A reusable box has according to the invention a floor having opposite side edges and opposite end edges bridging the side edges, respective side walls extending upward from the side edges, a fixed end wall extending upward from one of the end edges and fixedly bridging between the side walls, and a movable end wall extending in a closed position upward from the other of the end walls and fitting between the side walls. The movable end wall is displaceable between a position clear of the side walls and giving access to an interior of the box at the other end. Stiffening formations extend to upper edges of both of the end walls that for nesting interfit when the one and other ends of an upper such box are set down on the one and other ends of a lower such box and that for stacking vertically engage each other to support the upper box above the lower box when the one and other end walls of the upper box are set down on the other and one end walls of the other box.

The movable end wall, when open, thus creates a full-width opening extending all the way between the side walls, so that anything that can fit in the box can be removed through this opening. On the other hand, when the movable end wall is in the closed position, its upper end solidly supports another such box. The box is both nestable and stackable, according to the criss-cross method whereby the upper boxes.

According to the invention a latch is provided for releasably securing the movable end wall in the closed position. To this end latching formations extending horizontally between the movable end wall and the side walls at the other end snugly interfitting in the closed position. These latching formations are teeth on confronting vertical edges of the movable end wall and side walls. The teeth have rounded edges. Furthermore the latch includes a pair U-shaped elements engageable between the side walls and the movable end wall.

The stiffening formations include an odd number of vertically extending grooves and ridges on one of the end walls and an even number of vertically extending grooves and ridges on the other of the end walls. The grooves and ridges terminate at the upper edges of the end walls and at lower edges of the end walls at flat support surfaces that engage each other flatly between the upper and lower box for stacking. Thus when one box is oriented with its end walls above the identical end walls of another box, the two boxes will slip together and nest. When the upper box is reversed it will sit atop the lower box and stack. In this system the walls are all canted outward such that the box tapers downward toward the floor.

According to the invention a hinge is provided between an end edge of the floor and a lower edge of the movable end wall furthermore the end wall is generally U-shaped, having a flat bight part extending full width between the side walls and a pair of short U-legs aligned in the closed position with the side walls.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
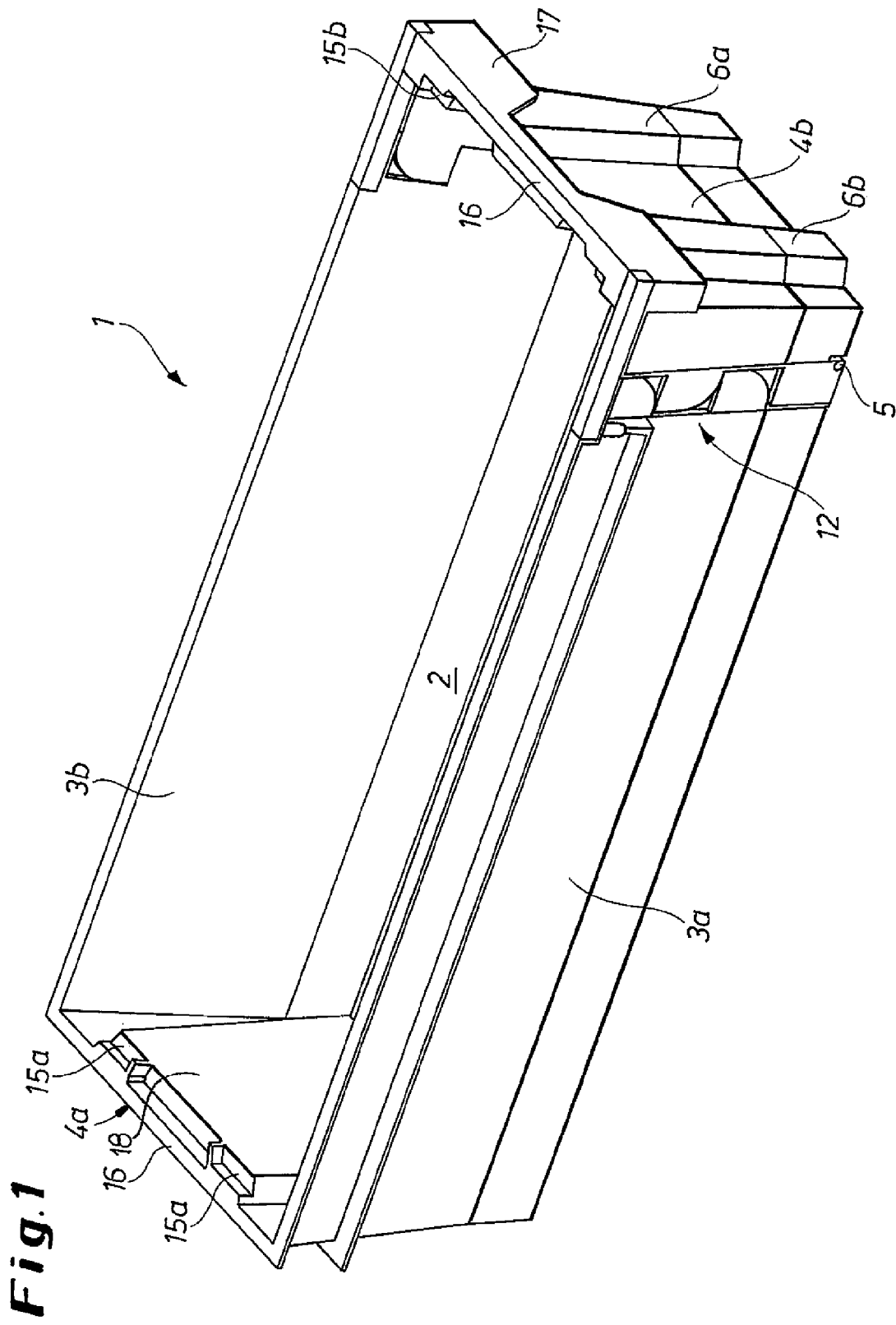
FIG. 1 is a perspective view of the box according to the invention with its end closed.
Figure 2:
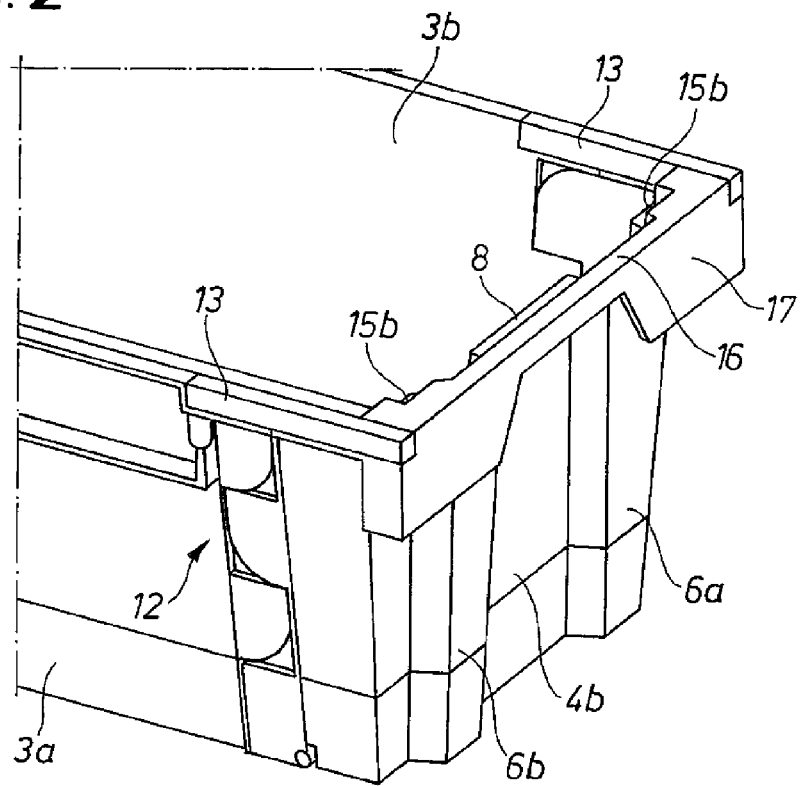
FIG. 2 is a large-scale view of the end of the box.
Figure 3:
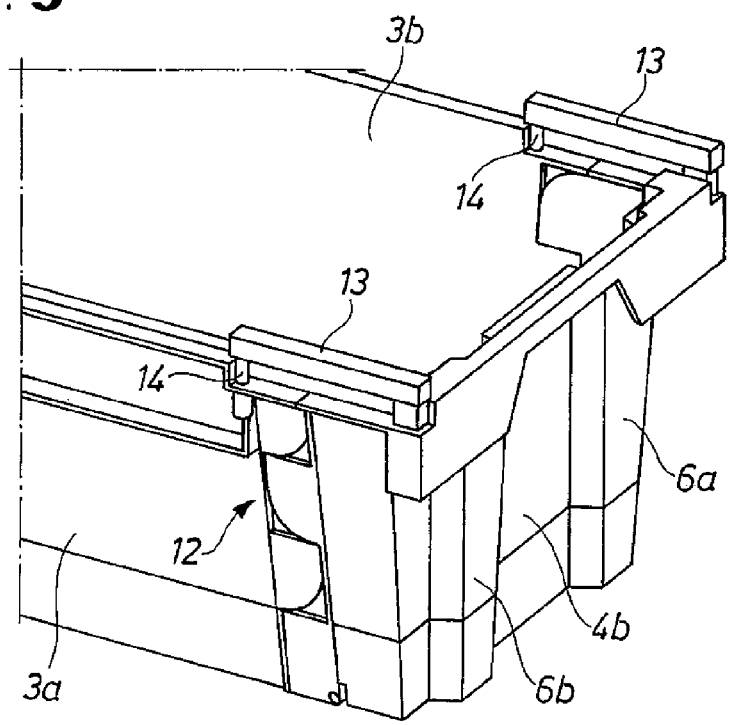
FIGS. 3 through 7 are views like FIG. 2 but showing the box end in successive stages of opening, with FIG. 7 showing it fully opened.
Figure 4:
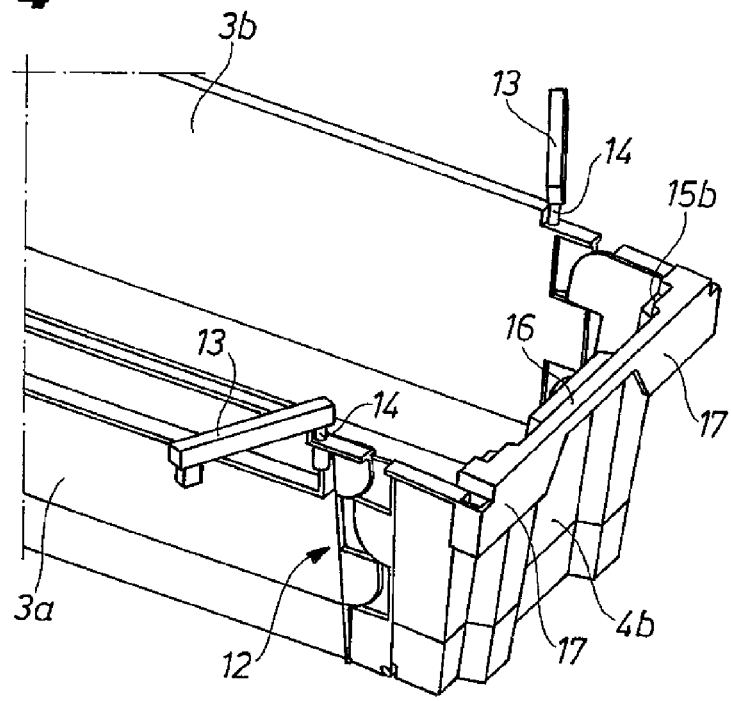
Figure 5:
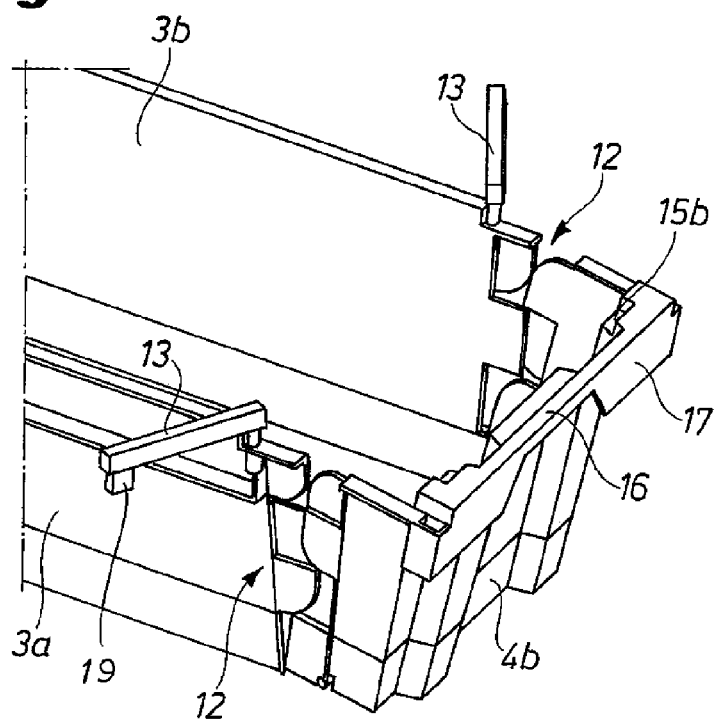
Figure 6:
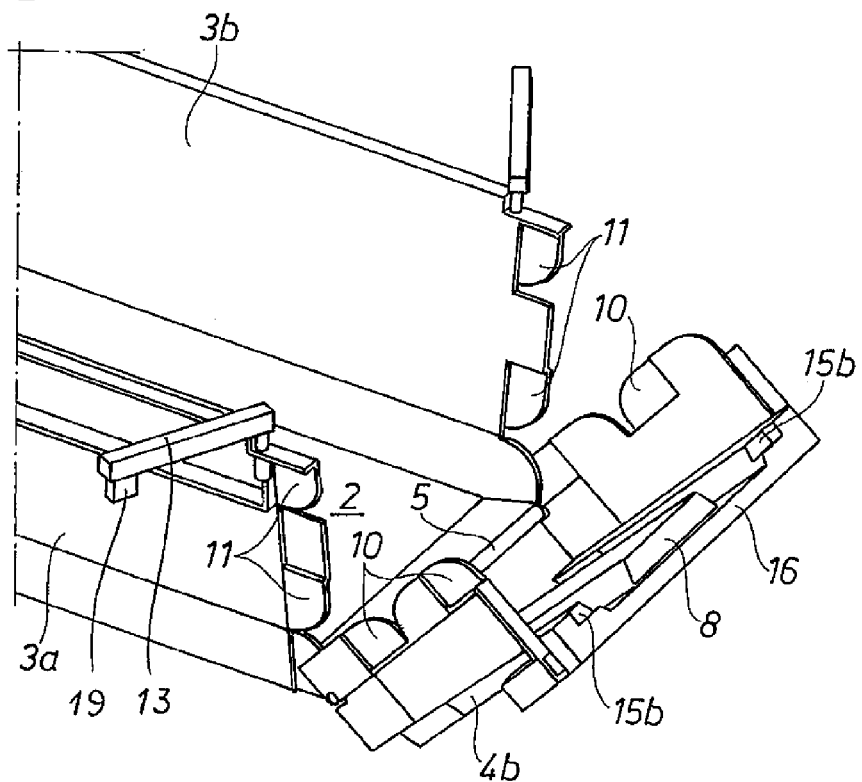
Figure 7:
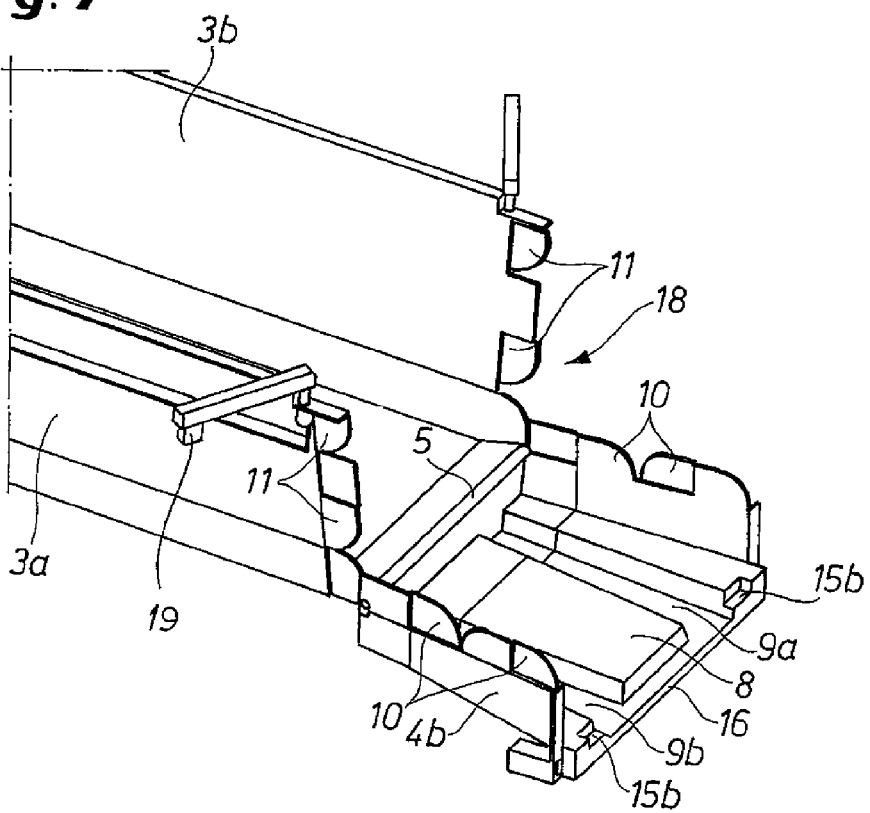

As seen in FIG. 1 a box 1 according to the invention has a rectangular, elongated, and normally horizontal floor 2. Longitudinal side walls 3a and 3b and end side walls 4a and 4b extend upward from the longitudinal and end edges of the floor 2, all canted outward somewhat so as to give the box 1 overall a slightly downwardly tapering or upwardly flaring shape. The end wall 4b fills the entire space between the ends of the walls 3a and 3b, and in fact is of U-shape seen from above so that its U-legs in effect form end extensions or portions of the walls 3a and 3b. A hinge 5 extending the full width of the one end edge of the floor 2 supports the wall 4b for movement between the fully closed position of FIGS. 1, 2, and 3 and the fully open position of FIG. 7. The hinge 5 can be constructed such that the entire end wall 4b is removable when it reaches the FIG. 7 position. The whole box 1 is formed of an injection-molded plastic and has a generally uniform wall thickness. The walls 3a, 3b, 4a, and 4b have at their upper edges outwardly projecting lips forming a continuous and planar upper rim 16, formed at the ends 4a and 4b with downwardly projecting stiffening skirts 17 that are notched out to form hand holds.

The box 1 can be nested or stacked. To this end as also shown in FIGS. 2 through 7 the movable end wall 4b is formed with two vertically extending outwardly projecting ridges 6a and 6b of trapezoidal section flanking a wide central and inwardly projecting ridge 8. These formations 6a, 6b, and 8 define a pair of inwardly open grooves 9a and 9b (FIG. 7) that are in fact complementary to the ridges 6a and 6b and into which the ridges 6a and 6b can fit for nesting when one box 1 is set atop another such box 1 with the end walls 4a and 4b of the upper box 1 above the respective end walls 4a and 4b of the lower box 1.

Similarly, the fixed end wall 4a is formed centrally with a wide inwardly projecting ridge 18 of an overall width that is equal generally to the center-to-center distance between the ridges 6a and 6b of the opposite end wall 4b. This ridge 18 also defines an outwardly open wide groove (not visible in the drawing) that allows nesting of two boxes also.

In addition the ridge 18 defines at its upper end a pair of support surfaces 15a that interfit perfectly with lower end surfaces of the ridges 6a and 6b when the upper box 1 is reversed and set atop the lower box 1. Similarly the ridges 6a and 6b define at their upper ends flat support surfaces 15b into which fit corners of a lower end surface of the ridge 18 in this reversed position.

Thus with this arrangement when two boxes 1 are aligned vertically in the same orientation, that is with the ends 4a and 4b of the upper box 1 above the respective ends 4a and 4b of the lower box 1, the boxes 1 will interfit and nest with the floor 2 of the upper box 1 virtually resting on the floor 2 of the lower box. When, however, the upper box 1 is reversed, its ridges 6a and 6b will sit on the surfaces 15a of the lower box and its ridge 18 will sit on the surfaces 15b of the lower box 1, and the boxes 1 will stack with the upper box 1 almost entirely above the lower box 1.

According to the invention means 12 is provided for securing the movable end wall 4b in the closed position of FIGS. and 2. This means 12 comprises horizontally extending and interfittable teeth 10 and 11 on the end wall 4b and sides 3a and 3b. These teeth 10 and 11 each have one rounded edge so that they can pivot together, with some elastic formation, but will latch solidly. In addition the means includes U-shaped latch elements 13 each having a vertical pin 14 seated and rotatable in a bore of the respective side wall 3a or 3b, and a opposite downwardly projecting dog or tab 19 that can fit in a complementary seat in the respective corner of the movable end wall 4b. It is therefore possible, once the latch elements 13 have been raised from a latching position of FIGS. and 2 to a freeing position shown in FIGS. 4 through 7, to pivot down the end wall 4b such that an opening 18 (FIG. 7) is formed that extends full-width between the side walls 3a and 3b. Thus anything that can be fitted into the box 1 can be pulled out through the opening 18, making it possible to use the box 1 for stocking in a shelf system.

I claim:

1. A reusable box comprising:
    a floor having opposite side edges and opposite end edges bridging the side edges;
    respective side walls extending upward from the side edges;
    a fixed end wall extending upward from one of the end edges and fixedly bridging between the side walls;
    a movable end wall extending in a closed position upward from the other of the end edges and fitting between the side walls, the movable end wall being displaceable away from the fixed end wall from the closed position into an open position clear of the side walls and giving access to an interior of the box at the other end, the side walls and movable end wall having adjacent upwardly open holes;
    at least one upwardly flaring vertical groove and at least one upwardly tapering vertical ridge extending to an upper edge of each of the end walls and terminating at upper and lower edges of the respective end walls at respective flat and horizontal support surfaces, the grooves and ridges being dimensioned and shaped such that, for nesting, they interfit when the fixed and movable end walls of an upper such box are set down respectively on the fixed and movable end walls of a lower such box and that, for stacking, they vertically engage each other at the support surfaces to support the upper box above the lower box when the fixed and movable end walls of the upper box are set down respectively on the movable and fixed end walls of the lower box; and
    a pair of U-shaped elements having legs fittable into the holes and extending between the movable end wall and the side walls for releasably securing the movable end wall in the closed position.

2. The box defined in claim 1, further comprising latching formations extending horizontally between the movable end wall and the side walls and snugly interfitting in the closed position.

3. The box defined in claim 2 wherein the latching formations are teeth on confronting vertical edges of the movable end wall and side walls.

4. The box defined in claim 3 wherein the teeth have rounded edges.

5. The box defined in claim 1 wherein there are an odd number of vertically extending grooves and ridges on one of the end walls and an even number of vertically extending grooves and ridges on the other of the end walls.

6. The box defined in claim 1 wherein the walls are all canted outward such that the box tapers downward toward the floor.

7. The box defined in claim 1, further comprising a hinge between an end edge of the floor and a lower edge of the movable end wall.

8. The box defined in claim 1 wherein the movable end wall is generally U-shaped and has a flat bight part extending full width between the side walls and a pair of short U-legs aligned in the closed position with the side walls.

9. The box defined in claim 1 wherein when the boxes are stacked with the movable end wall in the closed position and the U-shaped elements fitted to the holes, each overlying box sits atop the U-shaped elements of the underlying box and retains them in the holes, whereby the respective movable end wall is locked in the closed position.

\* \* \* \* \*